(12) United States Patent
Gaucas et al.

(10) Patent No.: US 7,769,724 B2
(45) Date of Patent: Aug. 3, 2010

(54) SYSTEM AND METHOD FOR PROVIDING S/MIME-BASED DOCUMENT DISTRIBUTION VIA ELECTRONIC MAIL MECHANISMS

(75) Inventors: Dale Ellen Gaucas, Rochester, NY (US); Tao Liang, Fremont, CA (US)

(73) Assignee: Xerox Corporation, Norwalk, CT (US)

( * ) Notice: Subject to any disclaimer, the term of this patent is extended or adjusted under 35 U.S.C. 154(b) by 407 days.

(21) Appl. No.: 11/094,067

(22) Filed: Mar. 30, 2005

(65) Prior Publication Data

US 2006/0173867 A1  Aug. 3, 2006

Related U.S. Application Data

(60) Provisional application No. 60/648,840, filed on Jan. 31, 2005.

(51) Int. Cl.
G06F 7/00 (2006.01)
G06F 17/00 (2006.01)

(52) U.S. Cl. .................. 707/687; 707/999.001
(58) Field of Classification Search .............. 707/1, 707/100, 687; 709/206
See application file for complete search history.

(56) References Cited

U.S. PATENT DOCUMENTS

| | | | |
|---|---|---|---|
| 5,713,019 A | 1/1998 | Keaten | |
| 5,790,790 A * | 8/1998 | Smith et al. | 709/206 |
| 5,802,299 A | 9/1998 | Logan et al. | |
| 6,061,448 A * | 5/2000 | Smith et al. | 380/282 |
| 6,167,394 A | 12/2000 | Leung et al. | |
| 6,289,460 B1 | 9/2001 | Hajmiragha | |
| 6,357,010 B1 | 3/2002 | Viets et al. | |
| 6,374,274 B1 | 4/2002 | Myers et al. | |
| 6,385,655 B1 * | 5/2002 | Smith et al. | 709/232 |
| 6,742,161 B1 | 5/2004 | James et al. | |
| 6,751,732 B2 | 6/2004 | Strobel et al. | |
| 6,839,741 B1 * | 1/2005 | Tsai | 709/217 |
| 7,257,639 B1 * | 8/2007 | Li et al. | 709/232 |

(Continued)

OTHER PUBLICATIONS

Web page article:"What's New in BSCW 4.2"; Dec. 9, 2004; http://www.bscw.fit.fraunhofer.de/Version42.html; 2 pages.

(Continued)

*Primary Examiner*—John E Breene
*Assistant Examiner*—Joshua Bullock
(74) *Attorney, Agent, or Firm*—Michael J. Nickerson; Basch & Nickerson LLP

(57) ABSTRACT

A content or document management system includes a content or document repository; a dedicated e-mail account; and a mail agent associated with the dedicated e-mail account. The mail agent processes a received e-mail message to determine a sender's identity; authenticates the identity of the sender and an authorization of the sender with respect to the content or document repository; parses, when a sender is authenticated and authorized, document request information from the e-mail message; and either stores a document to or retrieves a document from the content or document repository. The mail agent may authenticate the identity of the sender using a digital signature, or may authenticate the identity of the sender using an e-mail address in a FROM header field of the received e-mail message header. The mail agent may decrypt encrypted messages from the sender, and may sign and encrypt responses to the sender.

2 Claims, 1 Drawing Sheet

U.S. PATENT DOCUMENTS

| | | |
|---|---|---|
| 7,409,425 B2 | 8/2008 | Naick et al. |
| 2003/0028495 A1 | 2/2003 | Pallante |
| 2003/0043402 A1 | 3/2003 | Manchala et al. |
| 2003/0099353 A1 | 5/2003 | Goh et al. |
| 2003/0145212 A1 | 7/2003 | Crumley |
| 2003/0237005 A1* | 12/2003 | Bar-Or et al. ............... 713/201 |
| 2005/0108335 A1* | 5/2005 | Naick et al. ................. 709/206 |
| 2006/0174118 A1 | 8/2006 | Gaucas et al. |
| 2006/0212286 A1* | 9/2006 | Pearson et al. ................. 704/9 |

OTHER PUBLICATIONS

Web Page article: Title: S/MIME and Sympa mailing lists manager; Dec. 9, 2004; http://www.sympa.org/documentation/article_smime/sympamime.html; 9 pages.

File History for U.S. Appl. No. 11/094,069, as of Oct. 1, 2008.

* cited by examiner

SYSTEM AND METHOD FOR PROVIDING S/MIME-BASED DOCUMENT DISTRIBUTION VIA ELECTRONIC MAIL MECHANISMS

PRIORITY INFORMATION

This application claims priority under 35 U.S.C. §119(e) to U.S. Provisional Patent Application Ser. No. 60/648,840, which was filed on Jan. 31, 2005. The entire content of U.S. Provisional Patent Application Ser. No. 60/648,840 is hereby incorporated by reference.

BACKGROUND

Providing document services over networks is well known. In one example, a server receives document service requests from a variety of client machines, such as computer devices, network enabled copier machines, facsimile machines, scanner devices and other multi-function devices. Each of the machines, however, may use one or more different security infrastructures running on their respective operating systems. The security of a document is dependent on the security provided by each of the machines involved in its transfer. Therefore, in order for the server to communicate with the client machines to provide them with document services, the client machines' operating system's security features must be enhanced by a method that can assure security comprehensively. This may include separate authentication methods between each pair of operating systems.

Document service requests and associated documents transmitted through a public network (such as the internet) to the server in this example are at risk of being intercepted, viewed and/or modified by unauthorized persons. Also, when the server in this example receives such document service requests, the requests may include one or more directives. Directives communicate specific options a user may request for the document services. The server fulfills the request and performs the requested actions using one or more server-side machines, including facsimile machines, computer devices, or storage facilities. For example, a directive may include a user's request that a document be printed using a server-side printer on a special type of paper. Further, a directive may include payment information such as a credit card number. Again, since the request is communicated using a public network, the security of the document service transactions are vulnerable to being compromised.

An example of a system for providing secure document services, including any directives, for client-side machines using one or more types of operating systems is described in U.S. patent application Ser. No. 09/946,923, filed on Sep. 5, 2001, and published on Mar. 6, 2003, as US Published Application 2003/0043402. The entire content of U.S. patent application Ser. No. 09/946,923 is hereby incorporated by reference.

As described in US Published Application 2003/0043402, the system runs on a distribution agent Web server accessible from one or more types of network Operating Systems ("OS") via a Secure Socket Layer ("SSL") channel. The system includes one or more subsystems, including a receiving system that receives one or more document service requests over a secure communications medium, an authentication system that authenticates each received document service request, a processing system that processes the one or more authenticated document service requests, and a request fulfillment system that fulfills each processed document service request.

For this conventional system to properly provide the described services, the firewall protecting the network must be configured, typically by opening additional ports through the firewall, to permit the desired communications. However, since each additional port opened through the firewall represents additional potential vulnerability to threats, firewall policies tend to resist or prohibit opening new ports for even legitimate access to information.

Therefore, it is desirable to provide a system capable of realizing the above-described secured document services without requiring a network to provide additional ports through an existing firewall. This can be accomplished by utilizing the existing ports in the firewall.

BRIEF DESCRIPTION OF THE DRAWING

The drawing is only for purposes of illustrating an embodiment and is not to be construed as limiting, wherein.

DETAILED DESCRIPTION

Figure 1:
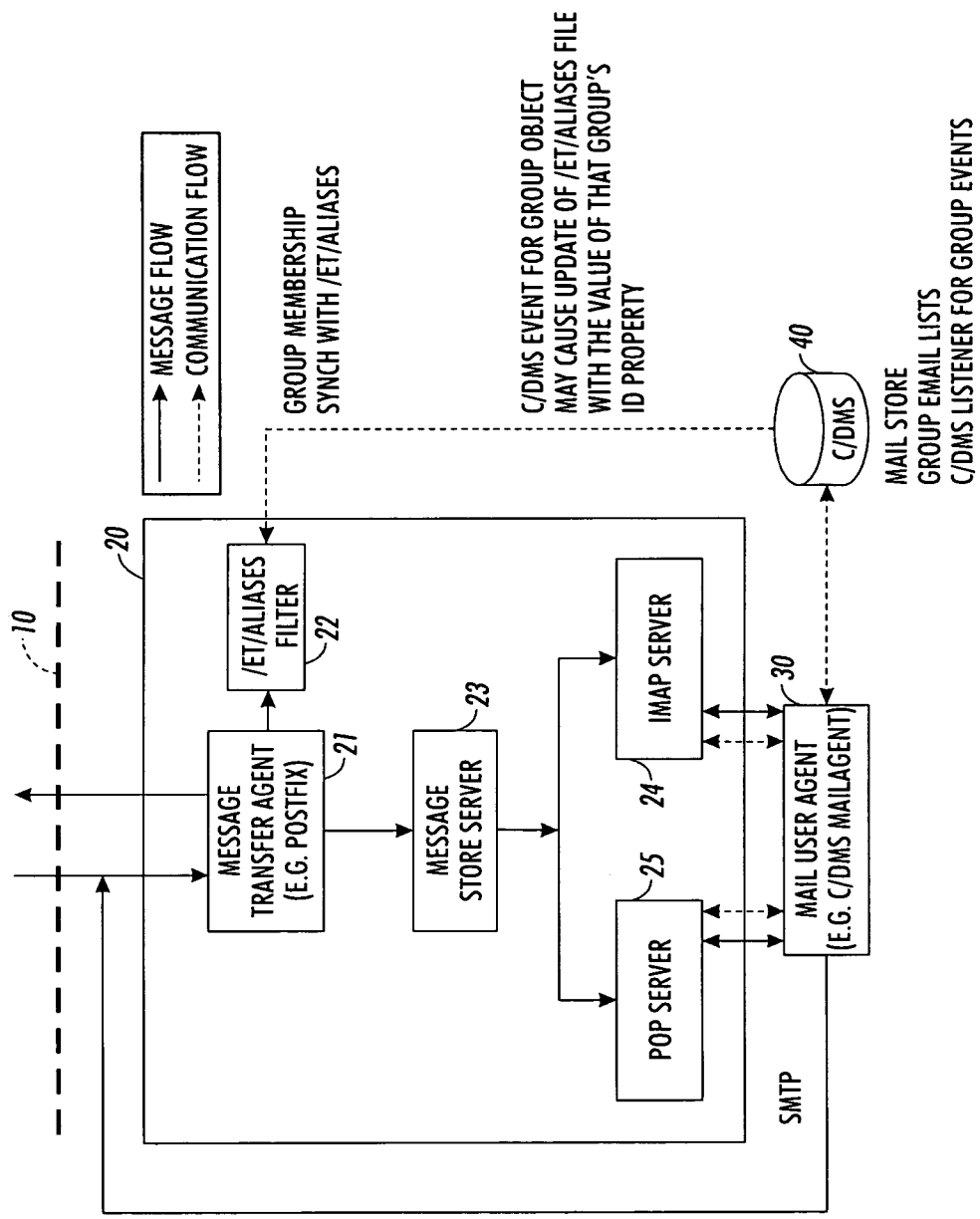
FIG. 1 illustrates a block diagram of an e-mail service for a content or document management system.

For a general understanding, reference is made to the drawing. In the drawing, like references have been used throughout to designate identical or equivalent elements. It is also noted that the drawing may not have been drawn to scale and that certain regions may have been purposely drawn disproportionately so that the features and concepts could be properly illustrated.

It is further noted that in the description below the term repository is used to refer generally to a collection of data or information. A repository may be, but is not limited to a collection of documents, a collection corresponding to content, and/or collection corresponding to knowledge.

An e-mail-based repository interface can provide a simple and secure alternative to an HTTP (HyperText Transfer Protocol) based interface, using S/MIME (Secure Multi-Purpose Internet Mail Extensions) based e-mail communication capabilities already available. Standard e-mail is used by some document repositories but does not provide sufficient security for sensitive information since it lacks secure authentication and cannot prevent interception of messages at arbitrary points on any network that the e-mail traverses. The e-mail-based repository interface, as described herein, is based on S/MIME and PKI (public key infrastructure) standards which are supported by many e-mail systems, e.g., Microsoft™, Netscape™, etc. These standards support digital signatures and encryption using public key infrastructure.

The e-mail-based repository interface allows for secure e-mailing of documents to a repository container, secure notification for the container subscribers, secure e-mailing of requests for documents from a content or document repository, and secure delivery of requested documents. The interface permits use of digital signatures for robust authentication of the sender, and encryption to protect messages even if intercepted. Authenticated and authorized users, regardless of whether the authenticated and authorized users are inside or outside of a firewall, may send documents securely to be stored in a repository, may send requests to retrieve documents securely from a repository, and may use a repository to further disseminate documents to a group of other users in a more efficient manner than is possible using conventional e-mail and repositories.

The e-mail-based repository interface uses a mail server (which can be an existing corporate mail server); a dedicated e-mail account for the repository management system; a POP3 (Post Office Protocol 3) or IMAP (Internet Message Access Protocol) mail agent for processing messages sent to this account; an X.509 certificate associated with this account if senders encrypt messages (or the mail agent signs notifications); an X.509 certificate for each sender if senders sign messages (or the mail agent encrypts notifications or requested documents); and an optional repository notification mechanism for notifying container subscribers of message additions.

The e-mail-based repository interface also supports the specification of meta-data in the message body that follows a pre-defined syntax. Such meta-data is interpreted by the mail agent and can be used to specify, for example, target containers, source documents, notification recipients, and document properties. Target containers can also be specified in parts of the message header. Multiple source documents and multiple target containers can be specified. Source and target specifications are discussed in more detail below.

To make a store or retrieve request, the user sends an e-mail to the dedicated e-mail account for the repository management system. The e-mail may be signed or encrypted. It is noted that only one digital certificate is required per server, thus users using encryption will only have to keep track of one public key, regardless of the target containers.

The e-mail may contain meta-data, and may also contain attachments in the case of a store request. The meta-data format is discussed in more detail below.

The e-mail is read by the repository management system's mail agent that polls the dedicated e-mail account mailbox every K minutes using a supported protocol for messages (e.g., POP3 or IMAP), like a standard e-mail reader. The mail agent reads a message, decrypts the message if encrypted, and validates the digital signature if the message is signed.

The mail agent processes a message for the sender's identity by using the message's digital signature (i.e., the e-mail address in the signature's accompanying digital certificate), or optionally, if the system is configured to do so, by using the e-mail address in the message's "FROM" header field. In either case, the e-mail address is used to lookup the user in the repository management system to determine if the user has a valid account on the system.

If the user has a valid account, the mail agent parses the message's meta-data for target container and source document specifications, and uses the repository's access control mechanism to determine whether the user has authorization to carry out the requested store or retrieve request. If the user's request is authorized, the mail agent interacts with the repository to carry out the store or retrieve request.

When a user sends an e-mail to make a store request, the mail agent processes the sender's identity, and the message meta-data as discussed above. If the store request is unauthorized, the user is sent an error notification. If the store request is authorized, the mail agent adds the message with attachments to the specified target container. Optionally, e-mail attachments may be stored directly in the target container, or may be added as children to a new e-mail repository object that is added to the target container. The user is assigned ownership of the stored entities. The methods, whereby the target containers are specified in the message header or message body, are discussed in more detail below.

The optional repository notification mechanism notifies container subscribers of message or document additions. The mail agent itself also may notify authorized recipients, specified in the message, with an e-mail containing repository links to the stored message or attachments. Notifications can contain the original message body. However, if notification encryption is desired, the container subscribers or specified recipients must have digital certificates in the repository store.

When a user sends an e-mail to make a retrieve request, the mail agent processes the sender's identity, and the message meta-data as discussed above. If the retrieve request is unauthorized, the user is sent an error notification. If the retrieve request is authorized, the mail agent retrieves the specified documents from the repository and attaches the retrieved documents to an e-mail addressed to the user. To provide secure distribution, the attachments may be encrypted and signed by the mail agent, using standard S/MIME features, to safeguard the documents from unauthorized recipients. The methods, whereby the source documents are specified in the message body, are discussed in more detail below.

As discussed above, the mail agent processes the target specifications in a store request. A target could be a user, a group, or any other container in the content or document management system (e.g., a Collection or a Folder). The form of a target can be any unique identifier such as the object ID provided by the system, or an "alias" provided by a user. Multiple targets can be specified. Some targets can be implied. For example, when a mail is sent to a Group, the e-mail can be saved to a Group's Collection in addition to being forwarded to the Group's members.

Three approaches are used to specify a target container in the e-mail request. The first approach to specifying a target collection makes use of the recipient name syntax allowable in an rfc822 address specification. The second approach makes use of a mail server redirect mechanism. The third approach makes use of a special syntax in the e-mail message body.

As noted above, the first approach for specifying target containers uses the name field of rfc822 address specification, i.e., "name"<local-part@domain>. Examples of this syntax are "Collection-10"<dsmail@xyz.abccorp.com> or "QAteam"<dsmail@xyz.abccorp.com> where dsmail@xyz.abccorp.com is the mail agent's single e-mail account and QAteam corresponds to the unique identifier of a user, group, or container in the content or document management system. When using this first approach, the mail agent reads and processes the message from its mailbox on the mail server, and interprets the name field as a target specification if the display name is not used for the mail agent itself.

The second approach for specifying target containers uses a redirect mechanism associated to e-mail servers to allow a target to be indicated in the local-part of the destination address of e-mail sent to the mail server, but to still be mapped to the single dedicated account for the mail agent. When using this second approach, the mail agent reads and processes the message from its mailbox, and interprets the local part of the address as a target specification. The following details on the redirect methods are provided in the context of a Unix-based Postfix Mail Transport Agent that incorporates a mail daemon. Methods for other systems might differ but the general concept remains the same.

The mail daemon uses a /etc/aliases file to allow addresses of the form QAteam@xyz.abccorp.com. A line in the alias file defines the mapping as follows: QATeam dsmail@xyz.abccorp.com.

E-mail aliases defined in the /etc/alias file essentially become recognized by the mail system as valid addresses. When e-mail is sent to one of the aliases (e.g., QATeam), the e-mail will be redirected to the single e-mail account monitored by the mail agent (e.g., dsmail@xyz.abccorp.com). After redirected, the e-mail does not get modified in any way, i.e., the "TO" header field of the message remains as is (e.g., QAteam@xyz.abccorp.com) even though the e-mail is placed into the dsmail mailbox file.

The actual /etc/alias file can be updated by an agent that synchronizes the unique identifiers for users, groups, and containers from the content or document management system to the file. Alternatively, the mail server's system administrator can enter selected aliases manually.

The third approach for specifying target containers uses of the body of the incoming e-mail message. The targets are specified in the message body using a pre-specified syntax and/or as the first or last line in a message. The syntax indicates the beginning and end of the targets specification, and the delimiter separating multiple targets. For example, a simple syntax is Send To: Collection-10, Group-12, QATeam.

The third approach is also used for specifying source documents. For example, a simple syntax is Retrieve: Document-1, Document-14.

When no targets are specified using the above three approaches, the authenticated user's personal collection is used as the target container.

FIG. 1 illustrates a block diagram of mail service that enables the various approaches discussed above. More specifically, FIG. 1 illustrates the interaction between the mail server, the mail agent, and the content or document management system. Although FIG. 1 illustrates a content or document management system, it is applicable to any repository.

As illustrated in FIG. 1, e-mail requests are received from the Internet 10 wherein the e-mail request either represents a request to store a message and attachments, or attachments alone, in the repository of the content or document management system 40 or a request to retrieve an identified document in the repository of the content or document management system 40. The e-mail request is received by a mail server 20 which the content or document management system 40 is using for its dedicated e-mail account.

The message transfer agent 21 may include a mail daemon for identifying the alias of the incoming e-mail. This alias is compared with the contents of the /etc/alias filter 22 to determine if the alias of the e-mail request is associated with the content or document management system's dedicated e-mail account. The e-mail request is stored on the message store server 23 for further processing. It is then accessed via a POP server 25 or IMAP server 24 by the mail agent 30. The mail agent 30 converts the e-mail request into the proper format for interacting with the content or document management system 40.

In summary, the system includes a repository; a dedicated e-mail account; and a mail agent associated with said dedicated e-mail account. The mail agent processes a received e-mail message to determine a sender's identity and authenticates the identity of the sender and authorizes the sender with respect to said repository. Also, the mail agent, when a sender is authenticated and authorized, parses document request information from the e-mail message, authorizes the specific request, and forwards a formal request to said repository.

A method for managing the distribution of documents in a repository, using a dedicated e-mail account and a mail agent associated with the dedicated e-mail account, processes a received e-mail message to determine a sender's identity; authenticates the identity of the sender and authorizes the sender with respect to the repository; parses, when a sender is authenticated and authorized for the repository, document request information from the e-mail message; authorizes the specific request; and forwards a formal request to the repository.

A method for specifying a target container to be used when storing a document in a repository interprets a name field of the e-mail destination address to specify a target container.

A method for specifying a target container to be used when storing a document in a repository interprets a local part of an e-mail destination address to specify a target container.

A method for specifying a target container to be used when storing a document in a repository interprets a predefined syntax and a predefined part of a body of the e-mail message to specify a target container. The predefined part of a body of the e-mail message may be a first line of the body of the e-mail message or a last line of the body of the e-mail message.

A method for specifying a target container to be used when storing a document in a repository interprets the authenticated user's personal collection as a target container when no target container is specified by other methods.

A method for specifying a source document to be used when retrieving a document from a repository interprets a predefined syntax and predefined part of a body of the e-mail message to specify a source document. The predefined part of a body of the e-mail message may be a first line of the body of the e-mail message or a last line of the body of the e-mail message.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for specifying a target container to be used when storing a document in a document repository containing a plurality of containers, each container delineating a distinct collection of documents, comprising:

(a) electronically sending a first e-mail message with an attached document to the document repository, the first e-mail message having an e-mail address field for identifying an e-mail account of a mail agent of the document repository, the first e-mail message having a name field in which contents can be specified independently of the e-mail address field, the name field of the first e-mail message specifying a target container within the document repository;

(b) electronically sending a second e-mail message with an attached document to the document repository, the second e-mail message having the same e-mail address field as the first e-mail message, the e-mail address field identifying the e-mail account of the mail agent of the document repository, the second e-mail message having a name field in which contents can be specified independently of the e-mail address field, the name field of the second e-mail message specifying a target container within the document repository, the name field of the second e-mail message being different from the name field of the first e-mail message, the name field of the second e-mail message specifying a target container within the document repository which is different from the target container specified by the name field of the first e-mail message;

(c) electronically receiving, at the mail agent of the document repository, the first and second e-mail messages with corresponding attached documents;

(d) electronically interpreting the name field of the first e-mail message to determine the specified target container within the document repository;

(e) electronically interpreting the name field of the second e-mail message to determine the specified target container within the document repository, the specified target container within the document repository determine by interpreting the name field of the second e-mail message is different than the specified target container within the document repository determine by interpreting the name field of the first e-mail message;

(f) electronically storing the attached document of the first e-mail message in the document repository at the target container specified by the interpretation of the name field of the first e-mail message; and (g) electronically storing the attached document of the second e-mail message in the document repository at the target container specified by the interpretation of the name field of the second e-mail message.

2. The method as claimed in claim 1, wherein the specified target container is associated with a personal collection when the interpretation of the name field of an e-mail message does not specify a target container.

* * * * *